US006989137B1

(12) United States Patent
Nishimura et al.

(10) Patent No.: US 6,989,137 B1
(45) Date of Patent: Jan. 24, 2006

(54) CARBONACEOUS MATERIAL FOR CELL AND CELL CONTAINING THE CARBONACEOUS MATERIAL

(75) Inventors: Kunio Nishimura, Kawasaki (JP); Akinori Sudoh, Kawasaki (JP); Chiaki Sotowa, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/807,075

(22) PCT Filed: Oct. 12, 1999

(86) PCT No.: PCT/JP99/05614

§ 371 (c)(1), (2), (4) Date: Apr. 9, 2001

(87) PCT Pub. No.: WO00/22687

PCT Pub. Date: Apr. 20, 2000

Related U.S. Application Data

(60) Provisional application No. 60/121,436, filed on Feb. 23, 1999.

(30) Foreign Application Priority Data

Oct. 9, 1998 (JP) .......................................... 10-287397

(51) Int. Cl.
*C01B 31/04* (2006.01)

(52) U.S. Cl. ..................................... 423/448; 429/231.8

(58) Field of Classification Search .............. 423/447.4, 423/445 R, 448; 429/231.4, 231.8
See application file for complete search history.

(56) References Cited

U.S. PATENT DOCUMENTS 5,344,724 A * 9/1994 Ozaki et al. .................. 429/94
5,591,545 A 1/1997 Miyashita et al.
5,591,547 A * 1/1997 Yoneda et al. .............. 429/220
5,677,082 A * 10/1997 Greinke et al. ............. 429/312
5,698,341 A * 12/1997 Tamaki et al. ........... 429/231.8
5,910,383 A * 6/1999 Hase et al. .............. 429/231.4

FOREIGN PATENT DOCUMENTS

| | | |
|---|---|---|
| EP | 0 527 054 A1 | 2/1993 |
| EP | 0 573 266 A1 | 12/1993 |
| EP | 0 848 440 A1 | 6/1998 |
| JP | 6-295725 | 10/1994 |
| JP | 6-295725 A | 10/1994 |
| JP | 8-31422 | 2/1996 |
| JP | 9-259886 | 10/1997 |
| JP | 9-306489 | 11/1997 |
| JP | 9-306495 | 11/1997 |
| JP | 10-188959 | 7/1998 |

OTHER PUBLICATIONS

International Search Report.
Patent Abstracts of Japan abstract of JP 9–306489 (Nov. 28, 1997).
Patent Abstracts of Japan abstract of JP 10–188959 (Jul. 21, 1998).
Patent Abstracts of Japan abstract of JP 8–031422 (Feb. 2, 1996).
Patent Abstracts of Japan abstract of JP 9–306495 (Nov. 28, 1997).
European Search Report dated Mar. 2, 2005.

* cited by examiner

*Primary Examiner*—Stanley S. Silverman
*Assistant Examiner*—Peter J Lish
(74) *Attorney, Agent, or Firm*—Sughrue Mion, PLLC

(57) ABSTRACT

The present invention relates to graphite powder and to a battery using it as a negative electrode material, the powder having a specific surface area of not more than 3 $m^2/g$, an aspect ratio of not more than 6, and a tapping bulk density of not less than 0.8 $g/cm^3$; or a tapping bulk density of not less than 0.8 $g/cm^3$ and an oxidation initiation temperature of not less than 600° C.; or a specific surface area of not more than 3 $m^2/g$ and a tapping bulk density of not less than 0.8 $g/cm^3$, a specific electrical resistance of the powder not more than 0.06 Ωcm in the specified condition. The battery obtained thus has a large discharge capacity, good cycle property and high charge and discharge efficiency.

25 Claims, 1 Drawing Sheet

CARBONACEOUS MATERIAL FOR CELL AND CELL CONTAINING THE CARBONACEOUS MATERIAL

CROSS-REFERENCE TO RELATED APPLICATIONS

This application claims the benefit of U.S. Provisional Application No. 60/121,436, filed Feb. 23, 1999.

TECHNICAL FIELD

The present invention relates to a carbon material for a lithium battery, more specifically, the present invention relates to a carbon material for a lithium battery having high discharge capacity, high charge and discharge efficiency and excellent cycle property.

This application is based on Japanese Patent Application No. Hei 10-287397, the contents of which are incorporated herein by reference.

BACKGROUND ART

In recent years, portable tools such as pocket telephones, compact video cameras and notebook-type personal computers have developed remarkably, and demands for a compact secondary battery such as Ni-hydrogen secondary battery or lithium secondary battery, as a powder source therefor are increasing.

In particular, a nonaqueous solvent-type lithium secondary battery using lithium, which is the basest metal, may allow realization of a compact lightweight high energy density battery. Accordingly, research and development thereof are proceeding aggressively.

A lithium secondary battery using metal lithium as a negative electrode is, however, disadvantageous in that dendritic acicular lithium crystals are readily generated and break through the separator and cause short-circuits.

As an effective means for solving this problem, a lithium ion secondary battery using a carbonized or graphitized carbon material for the negative electrode and a nonaqueous solvent containing lithium ion for the electrolytic solution has been proposed and is used in practice.

More specifically, the charge and discharge reaction is designed to take place in such a manner that when the carbon is doped, intercalated or the like by lithium ion, charging occurs, whereas when the lithium ion is dedoped or deintercalated, discharging occurs, so that the metal lithium can be prevented from precipitating and can be completely used. This reaction mechanism is being aggressively studied but has not yet been completely elucidated.

In the lithium secondary battery, carbon materials such as natural graphite, artificial graphite, pitch type carbon particles, pitch type carbon fibers, vapor grown carbon fibers, or non-graphitizable products baked under low temperature, are used as the negative electrode, and lithium is used as an active material thereof.

In order to increase the discharge capacity of lithium batteries, the amount of lithium taken in into the carbon must be increased as much as possible. On the other hand, the lithium taken in must be easily released. These intake and release actions preferably proceed smoothly and are not subject to any large change in the balance therebetween even if the actions are repeated. When this is successfully accomplished, a high current efficiency and a long cycle life can be attained.

It is said that as the graphite has a higher crystallinity, the amount of lithium taken in into a carbon (graphite) material increases. In general, the graphite can have further improved crystallinity when the graphitization temperature is higher. However, the graphitization temperature is generally about 3,200° C. at the highest and there is a definite limit to improving the crystallization of graphite by only temperature regulation. In order to solve this problem, JP-A-8-31422 (the term "JP-A" as used herein means an "unexamined published Japanese patent application") discloses a technique of adding boron (B) to carbon powder and graphitizing the mixed powder, thereby elevating the crystallinity. Also, JP-A-9-259886 discloses a technique of processing a specific carbon to thereby improve the crystallinity of the graphite powder and reduce the specific surface area.

In a lithium battery, graphite powder formed into a paste using a binder is coated on a metal foil, a metal mesh or the like to form an electrode (negative electrode). The powder used preferably has a small specific surface area. The reasons therefor are described below. A passive film comprising an electrolytic solution or the like is formed on the surface of the graphite powder and as the specific surface area of the powder becomes larger, the production of the passive film increases. The passive film is a significant cause of reduction of the use efficiency of lithium. When the carbon material has a high activity, the electrolytic solution is decomposed, resulting in a short cycle life. Therefore, the activity of the carbon material is preferably decreased as much as possible. For this purpose, a carbon material having a lower chemical activity (reactivity) and a smaller specific surface area is preferably employed. Also, when the specific surface area of the powder becomes large, the amount of binder used in the formation of the powder into a poled plate increases and the coverage of binder on the graphite particles proportionally increases. As a result, the contact ratio between the graphite particles and the electrolytic solution is reduced and the charge and discharge capacity decreases.

As the capacity of the battery increases, the battery charges and discharges more current, and the required conductivity of the electrode increases compared with those of conventional batteries. More specifically, when the material requires a large amount of binder because of the low conductivity or poor coating performance, the resistance of the electrode plate itself is increased. As a result, this causes not only a decreases of the discharge capacity and Coulomb efficiency, but also a increase of heat generation and partial heat generation, as well as the possibility of dendrite generation, which is not preferable from the view point of safety. Accordingly, it is necessary to develop a carbon material which has the high conductivity of carbon itself, excellent coating performance, and increased charge and discharge capacity.

The method for obtaining graphite powder includes a method of pulverizing coke and the like and then graphitizing the powder and a method of graphitizing coke or the like and then pulverizing it. JP-A-6-295725 employs the latter method. When graphite is first formed and then pulverized, the graphite becomes highly crystallized having increased hardness and strength, which makes pulverization thereof difficult. In addition, the pulverization of graphite requires large force. When a large force is applied in pulverization, a greater amount of fine powder is produced, the particles are more liable to have scaly shapes, and the aspect ratio is increased. Due to the increased aspect ratio, more particles of flat shaped crystals are included, the specific area of the powder is increased, and the battery performance decreases.

The discharge capacity may be increased by increasing the crystallinity of the graphite and reducing the specific surface area of the graphite powder. However, not only these factors but also the permeability of the electrolytic solution, attributable to the shape of graphite powder, or the filling ratio of graphite particles during formation into an electrode, affect the battery properties. In the patent publications described above, these problems are not specifically addressed. In addition, the activity (reactivity) of the graphite powder, conductivity or the like should be considered.

DISCLOSURE OF INVENTION

The object of the present invention is to provide a carbon material for a lithium battery, ensuring a large discharge capacity, high charge and discharge efficiency, excellent cycle property, good coating performance and an increase in the carbon density in the electrode, in which the carbon powder is graphitized after the properties thereof have been controlled. Another object of the present invention is to provide a paste for a negative electrode using the above carbon material as a main material, and a battery using a negative electrode employing it.

The present invention comprises the following inventions.

(1) A carbon material for a lithium battery, comprising graphite powder having a specific surface area of 3 $m^2/g$ or less, an aspect ratio of 6 or less, and a tapping bulk density of 0.8 $g/cm^3$ or more.

(2) The carbon material for a lithium battery as described in (1) above, wherein the oxidation initiation temperature of said graphite powder is 600° C. or more.

(3) The carbon material for a lithium battery as described in (1) or (2) above, wherein when said powder is subject to pressure to give said powder a bulk density of 1.5 $g/cm^3$, a specific electrical resistance of said powder along a direction perpendicular to the direction of the pressure is 0.06 Ωcm or less.

(4) A carbon material for a lithium battery, consisting of graphite powder having a tapping bulk density of 0.8 $g/cm^3$ or more and an oxidation initiation temperature of 600° C. or more.

(5) The carbon material for a lithium battery as described in (4) above, with a specific surface area of 3 $m^2/g$ or less.

(6) The carbon material for a lithium battery as described in (4) or (5) above, with an aspect ratio of 6 or less.

(7) A carbon material for a lithium battery, comprising graphite powder having a specific surface area of 3 $m^2/g$ or less and a tapping bulk density of 0.8 $g/cm^3$ or more, wherein when said powder is subject to pressure to give said powder a bulk density of 1.5 $g/cm^3$, a specific electrical resistance of said powder along the direction perpendicular to the direction of the pressure is 0.06 Ωcm or less.

(8) The carbon material for a lithium battery as described in any one of (1) to (7) above, wherein the graphite powder has an average particle size of from 8 to 30 μm.

(9) The carbon material for a lithium battery as described in any one of (1) to (8) above, wherein the graphite powder contains substantially no particles having a particle size of 3 μm or less and/or 53 μm or more.

(10) The carbon material for a lithium battery as described in any one of (1) to (9) above, wherein the graphite powder has a Co value of 6.745 Å or less.

(11) The carbon material for a lithium battery as described in any one of (1) to (10) above, wherein the graphite powder contains boron.

(12) A paste for a negative electrode of a battery, wherein said paste is obtained by adding polyvinylidene fluoride powder to the graphite powder as described in any one of (1) to (11) above as a main material, and kneading.

(13) A battery comprising a negative electrode produced from graphite powder as described in any one of (1) to (11) above as a main material.

(14) A lithium battery comprising a negative electrode produced from graphite powder as described in any one of (1) to (11) above as a main material.

The graphite powder of the present invention has a small aspect ratio and the amount of scaly particles therein is small. When particles have the shape of scales, they are oriented parallel to a surface layer of the electrode and the permeability of electrolytic solution is reduced. The particles of the graphite powder of the present invention are spherelike and exhibit excellent permeability of the electrolytic solution.

The bulk density of the powder is increased because there is a reduction in the amount of scaly particles or removal of fine particles having a size of 5 μm or less. When the bulk density is increased, more graphite particles are included per unit volume, and therefore, the intercalation rate of lithium may be increased.

The graphite powder of the present invention has small specific surface area because it is graphitized after pulverization of cokes and the like. Therefore, a passive film is not formed on the surface of the particles by electrolytic solution. In addition, due to the small specific surface area, a small amount of binder is required when forming electrodes, and the binder is less prone to interfere with the contact between the graphite particles and the electrolytic solution.

Furthermore, by adding boron to the powder of cokes or the like and then graphitizing, the graphitization rate (crystallinity) can be improved, and as a result the intercalation rate of lithium into the graphite lattice is increased.

Another important aspect of the present invention is that the addition of B improves the antioxidation properties, reduces the electric resistance of the powder, and remarkably improves the conductivity.

Further, the improvement in resistance to oxidation decreases the activity of the surface of the particles, and the improvement in conductivity increases the intercalation capacity.

BEST MODE FOR CARRYING OUT THE INVENTION

Figure 1:
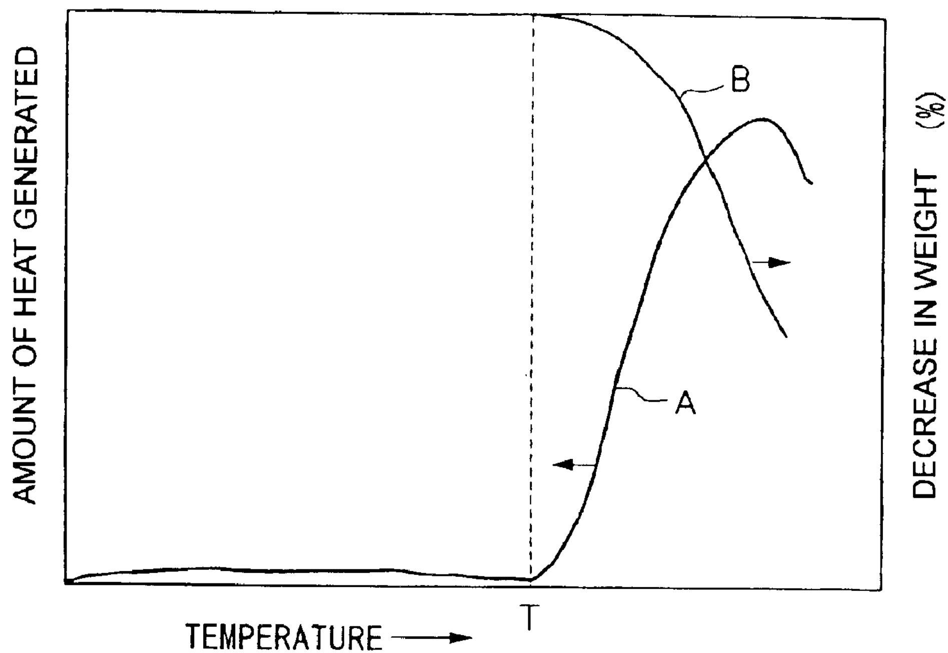
FIG. 1 shows a curve indicating the amount of heat generated and the decrease of weight determined by TG/DTA determination.

The first aspect of the present invention is the above-described carbon material for a lithium battery, comprising graphite carbon having a specific surface area, aspect ration, and tapping bulk density as specified above. This carbon material is particularly suitable as the negative electrode of a lithium battery.

The specific surface area of the graphite powder as the electrode of a lithium battery is preferably smaller. The graphite powder for use in the present invention has a specific surface area (BET method) of 3 $m^2/g$ or less. If the specific surface area exceeds 3 $m^2/g$, the surface activity of the graphite powder is increased and due to the decomposition of electrolytic solution or the like, the Coulombic efficiency decreases. Furthermore, a large amount of binder is required in the formation of the electrode, which gives rise to a high coverage of binder on the graphite particles which in turn reduces the discharge capacity of the produced battery. In addition, as described above, if the activity is increased, the surface of graphite particle enters the passive state and the performance is liable to decrease. Important factors for reducing the specific surface area are the particle size, the particle shape, the particle size distribution, the surface properties and the like. In particular, the graphite particles are preferably formed into a nearly spherical shape.

In order to increase the capacity of a battery, it is important to raise the filling density of the graphite particles. Also to this purpose, the graphite powder particles preferably have a nearly spherical shape, and not a scaly shape. If the particle shape is expressed by an aspect ratio, the graphite powder particles for use in the present invention have an aspect ratio of 6 or less, preferably 5 or less. The aspect ratio is generally the (length of long axis)/(length of short axis) ratio of the particles and the value thereof may be obtained from a microphotograph of the particle, however, in the present invention, the aspect ratio is determined as follows.

The average particle size A calculated by the laser diffraction scattering method and the average particle size B calculated by the electrical detection method (Coulter-Counter method) are obtained. From the principles of respective measurements, A is recognized as the diameter of a sphere corresponding to the largest length of the particle and B is recognized as the diameter of a sphere having the same volume as the particle. Assuming that the particle is a disk, the bottom face diameter of disk is A, the volume is $4/3\times(B/2)^3\pi=C$ and then, the thickness of disk can be calculated by $T=C/(A/2)^2\pi$. Accordingly, the aspect ratio is A/T.

In general, when the graphite is pulverized, the resulting particles are liable to be scale-shaped in many cases. In particular, when graphite is first formed and then pulverized, the higher the processing temperature, the stronger the tendency to form scaly particles and moreover, the smaller the particle size of the powder, the more liable the formation of scaly particles since stronger forces are applied during pulverization. The electrode plate of a battery is formed by coating a paste containing graphite powder on a metal mesh or a metal sheet of a metal such as aluminum and then press-bonding it. At this time, if the aspect ratio of the graphite powder exceeds 6, the scaly graphite particles are oriented to readily form a mirror surface. If a mirror face is formed, the permeability of the electrolytic solution into the electrode plate is deteriorated and the discharge capacity of the battery decreases. Furthermore, scaly graphite has a poor particle filling property, and therefore reduces the density of graphite in the electrode.

As the graphite powder used as the electrode of a lithium battery has a more satisfactory filling property, namely, a higher bulk density, the battery can have a higher discharge capacity. The graphite powder for use in the present invention has a tapping bulk density of 0.8 g/cm$^3$ or more, preferably 0.9 g/cm$^3$ or more.

In the present invention, the tapping bulk density is measured as follows.

A fixed amount of graphite powder (6.0 g) is weighed and placed in a 15-mmϕ cell for measurement and the cell is set in a tapping apparatus. After free dropping 400 times from a height of 45 mm at a tapping rate of 2 sec/time, the volume is measured and from the relationship between the weight and the volume, the bulk density is calculated.

The tapping bulk density of graphite powder is related to the particle size, the shape and the surface properties of the particles, and varies according to the particle size distribution even if the average particle size is the same. If the number of scaly particles or fine particles is large, the tapping bulk density may not be high. For example, after merely pulverizing a graphite material to have an average particle size of from 10 to 30 μm, many fine particles are produced and a tapping bulk density of 0.8 g/cm$^3$ or more is very difficult to attain using the powder. The graphite powder for use in the present invention has as low a content of fine powder as possible, a high tapping density and at the same time, has a small aspect ratio for the graphite powder, namely, it is not scale-shaped, or is scaliness, so as not to impede the permeation of the electrolytic solution and so that the filling density can be increased.

As described above, the graphite powder preferably has a low activity and a high conductivity. As an index of the activity, the oxidation initiation temperature of graphite can be used. In general, when the activity is high, the oxidation initiation temperature is low.

In the graphite powder of the present invention, having the above described specific surface area, aspect ratio, and tapping bulk density, the oxidation initiation temperature (measured under the conditions explained below) is preferably 600° C. or more. The conductivity represented by the specific electric resistance (measured under the conditions explained below) is preferably 0.06 Ωcm or less.

The second aspect of the present invention is a carbon material for lithium battery having the specified oxidation initiation temperature and tapping bulk density as described above. The oxidation initiation temperature of the graphite powder is one of the indices for the graphite activity. The graphite powder having a high oxidation initiation temperature has a low activity and it is preferable for use in a battery.

In the present invention, the oxidation initiation temperature is measured according to the following method and conditions. Using a general TG/DTA measurement apparatus (thermogravimetry/differential thermal analysis), the amount of heat generated and decrease in weight by oxidation are measured when the temperature is increased in the air flow. This state is qualitatively shown in FIG. 1. In FIG. 1, the axis of abscissas indicates the temperature elevated by the predetermined elevation rate, Curve A is the curve of heat generation as determined by differential thermal analysis (the left scale of the axis of ordinates), and Curve B is the curve of the decrease in weight (the right scale of the axis of ordinates). When the temperature of the sample is elevated, heat generation occurs by oxidation, and the initiation temperature thereof appears at Point T in FIG. 1. When the sample is oxidized, the weight decreases, as shown in Curve B, but the initiation point thereof, which comes a little after Point T, does not appear as sharply as the initiation point of heat generation. Accordingly, in the present invention, the oxidation initiation temperature is referred to as the initiation Point T of heat generation. The conditions of measurement are samples of 5 mg, an air flow rate of 100 ml/min., and a temperature increase rate of 10° C./min. The samples are graphite powders having various particle sizes used for lithium batteries. Even if the graphite powders are produced from the same material, the graphite powders with smaller particle sizes tend to initiate oxidation at lower temperatures, for example.

The oxidation initiation temperature of the second graphite powder is 600° C. or more according to the above measurement method. The oxidation initiation temperature has a correlation with not only the chemical activity of the graphite powder, but also with the shapes of the particles, the specific surface area or the like. In order to reduce the chemical activity, graphite made from easily-graphitized carbon materials such as cokes is preferable. Regarding the shapes of the particles, the aspect ratio determined as the above is 6 or less, and the specific surface area is 3 $m^2/g$ or less.

The bulk density of the graphite powder is 0.8 $g/cm^3$ or more, preferably 0.9 $g/cm^3$ or more, as in the first invention, in order to increase the capacity of the battery. In addition, the specific electric resistance, which is described below, may be 0.06 Ωcm or less.

The third aspect of the present invention is a carbon material for a lithium battery, which has the specific electric resistance, specific surface area, and tapping bulk density as specified above. When the graphite powder has high specific electric resistance, namely, a low conductivity, it causes not only a decrease in the discharge capacity and Coulombic efficiency, but also an increase in heat generation. The specific electric resistance in the third invention is 0.06 Ωcm or less, which is measured according to the following method, shown in FIG. 2.

Figure 2:
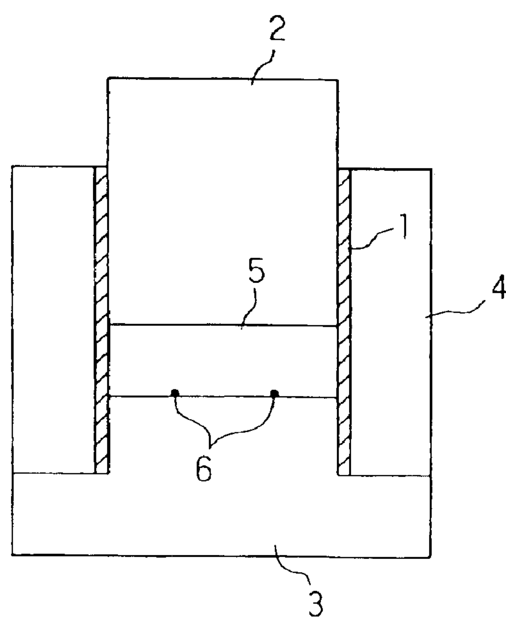
FIG. 2 is a cross section diagram illustrating the apparatus for determining the electric resistance of the graphite powder.

In FIG. 2, symbol 1 designates an electrode consisting of a copper plate, symbol 2 a compressing rod consisting of resin, symbol 3 a dish of resin, symbol 4 a side frame of resin, symbol 5 a sample of the graphite powder, and symbol 6 a terminal for measuring the voltage provided at the lower end of the sample and the central portion along the vertical direction of the page.

According to the four terminal method, shown in FIG. 2, the specific electric resistance of the sample is measured as follows. The sample is compressed by the compressing rod 2. The current (I) is made to flow from electrode 1. The voltage (V) between the terminals is measured by the terminal 6. This voltage is the voltage determined when the bulk density of the sample becomes 1.5 $g/cm^3$ by the compressing rod. When the electric resistance (between terminals) is R (Ω), the formula R=V/I is obtained. From this formula, the specific electric resistance can be obtained by using the formula ρ=R·S/L, wherein ρ designates the specific electric resistance; S designates a sectional area ($cm^2$) along the direction of the current through the sample, that is, perpendicular to the direction of the pressure; and L designates the distance between terminals 6 (cm). In actual measurement, the perpendicular cross section of the sample is about 1 cm (width)×about 0.5 to 1 cm (long or height), and the length along the current direction is 4 cm, and the distance (L) between terminals is 1 cm.

In order to increase the conductivity of the graphite powder, the conductivity of the graphite itself must be increased, and therefore, an improvement in the crystallinity is necessary. For this purpose, it is effective to use the graphite produced from an easily-graphitizable material, or to increase the graphitizing temperature, for example. In addition, it is effective to improve the crystallinity of the graphite by using a graphitizing catalyst such as boron (B). It is also effective to decrease the number of contact points between the particles of the graphite, that is, to decrease the content of fine powder. In view of the conductivity, the particles of the graphite are preferably large. However, since there is a limit regarding the thickness of graphite powdery layer to be applied for an electrode of a battery, it is not possible to use graphite powder having very large particles. Therefore, the average particle size of the graphite is increased as much as possible provided that it does not cause problems in the electrode.

In the third invention, as in the first invention, the specific surface area, and the tapping bulk density are 3 $m^2/g$ or less, and 0.8 $g/cm^3$ or more, preferably 0.9 $g/cm^3$ or more, respectively. The aspect ratio is preferably 6 or less, more preferably 5 or less. Furthermore, the oxidation initiation temperature may be 600® C. or more, as described above.

The graphite powder of the present invention (the above first to third inventions) preferably has as high a crystallinity as possible. The lattice distance (Co) of the graphite structure, in which the hexagon network layers are laminated, is preferably 6.745 Å or less, more preferably 6.730 Å or less, still more preferably 6.720 Å or less. By improving the crystallinity of the graphite powder, the charge and discharge capacity of battery can be increased, and the specific electric resistance can be decreased.

The graphite powder may contain a graphite catalyst such as boron (B), beryllium, aluminum, silicon, or the like. Among these, boron is effective, and by adding B to carbon powder and graphitizing, the graphitization degree (crystallinity) is increased and Co value is decreased. In addition, for obtaining graphite having the same crystallinity, the graphitization with the addition of B can be conducted at lower temperature, compared with the graphitization without the addition of B. The content of B may be within a range in which boron is solid-dissolved in the graphite crystal. Even if the content exceeds this range, the function of catalyst is not increased. The upper limit thereof is about 10% by weight. Namely, the graphite powder may contain an amount of B of about 10% by weight or less, preferably 5% by weight or less.

The graphite powder for use in the present invention preferably has a particle size in terms of the average particle size of from 8 to 30 μm, more preferably from 10 to 25 μm. This average particle size is determined by the laser diffraction scattering method, more specifically, using a Macrotrack HRA apparatus manufactured by Nikkiso KK. The measuring conditions are such that 50 mg of a sample is weighed and added to 50 ml of distilled water, 0.2 ml of a 2% aqueous Triton™ (surface active agent) solution is further added thereto, the mixed solution is ultrasonic dispersed for 3 minutes and then, the average particle size is determined by the apparatus.

If the average particle size of the graphite powder is less than 8 μm, not only is a large aspect ratio liable to result, but also, the specific surface area increases and it becomes difficult to control it to the value of 3 $m^2/g$ or less specified in the present invention and also the tapping bulk density of powder is not increased. As a result, the voltage flatness becomes deteriorated and this is disadvantageous in fabricating a battery. The voltage flatness means the flatness of the charge and discharge curve. More specifically, in the case of a battery where metal Li is used as the standard electrode and Li is intercalated/deintercalated into the carbon electrode, the charge and discharge curve has a long continuing plateau region in vicinity of 100 mV. This part is preferably small in the voltage change and continues long and this is an index of the flatness. The capacity of the battery is the sum of this plateau region and the subsequent trapping region where adsorption/desorption of Li onto the particle surface takes place involving an abrupt increase in the voltage. The trapping region increases as the surface area of the particles becomes larger, as a result, the flatness decreases. The decrease in the flatness comes out as a voltage fluctuation when the electrode is loaded into a battery and in the case of an apparatus where a stable voltage is required, disadvantageously narrows the usable region and causes a reduction in the capacity.

When forming an electrode using graphite powder, a method of forming the graphite powder into a paste with a binder and coating the paste onto a metal plate or the like is generally used. If the average particle size of the powder is less than 8 μm, this means that fine powder particles having a particle size of less than 8 μm are contained in a fairly large amount, and the paste suffers from increased viscosity and poor coatability. Therefore, also from this point of view, the average particle size of the powder is preferably 8 μm or more. When the average particle size is less than 8 μm, or particles less than 3 μm are contained, the activity of the powder increases, and the specific electric resistance increases. It is more preferred to remove particles having a particle size of less than 8 μm by classification or the like.

The upper limit of the particle size of the graphite powder is restricted by the fact that the thickness of the graphite powder layer formed of the above-described paste is usually from about 50 to 200 μm. In order to distribute graphite the particles as uniformly as possible, the average particle size of graphite powder is preferably 30 μm or less. If coarse particles having a particle size of 53 μm or more are mixed into the graphite powder, many irregularities are generated on the electrode surface and give rise to damage of the separator used in the battery.

From these aspects, the graphite powder of the present invention preferably has an average particle size of from 8 to 30 μm. The graphite powder more preferably contains substantially no (5% by weight or less) particles having a particle size of 3 μm or less and/or no particle having a particle size of 53 μm or more, as a result of removing those particles. When particles having a particle size of 3 μm or less or 53 μm or more are removed, the average particle size of graphite powder is from 10 to 25 μm.

The graphite powder of the present invention can be produced as follows.

In order to obtain graphite powder, coke is usually produced first. The raw material for the coke is petroleum pitch or coal pitch, and by carbonizing the raw material, coke is produced. For forming graphite powder from coke, a method of pulverizing the coke and then graphitizing the particles, a method of graphitizing the coke itself and then pulverizing it, a method of adding a binder to coke, molding and calcining the mixture, graphitizing the calcined product (the coke and this calcined product are collectively called coke and the like) and then pulverizing it into powder is usually used.

However, when the coke and the like are graphitized and then pulverized, a scaly powder is likely to be produced at the time of pulverization because crystals are grown. Therefore, in order to obtain powder particles having a small aspect ratio, namely, as close to spherical as possible, for use in the present invention, it is preferred to pulverize the coke and the like before graphitization, classify the particles into predetermined particle sizes and specific surface areas, and then graphitize the particles. The raw material coke and the like preferably have no grown crystals, accordingly, those heat-treated at 2,000° C. or less, preferably 1,200° C. or less are suitably used.

The aspect ratio after the pulverization varies depending on the kind of raw material coke. Coke is known to include easily graphitizable coke, i.e., so-called needle coke, and non-needle coke having a graphitizability inferior to that of needle coke. According to the knowledge of the present inventors, it has been found that when coke is pulverized, non-needle coke is suitable for obtaining powder particles having a small aspect ratio, namely, nearly spherical particles. Therefore, the raw material coke is preferably non-needle coke heat-treated at 2,000° C. or less, preferably 1,200° C. or less.

When the powder of coke and the like is graphitized, not only does crystallization proceed but also the surface area of the particles is also reduced, thus, the above-described method is also preferred from this point of view. For example, a coke powder having an average particle size of about 10 μm obtained by pulverizing coke has a specific surface area of about 14 $m^2/g$. When this powder is graphitized at 2,800° C. or more, the specific surface area is reduced to from 2 to 3 $m^2/g$. On the other hand, if the coke is graphitized and then pulverized, the specific area is at least 5 $m^2/g$ or more and in some cases, 10 $m^2/g$ or more, though it may vary according to the particle size. It is considered that in the method of pulverizing coke and then graphitizing particles, the carbon atoms are re-oriented by the graphitization and furthermore, a part of the surface evaporates due to the high-temperature processing, therefore, the surface is cleaned or smoothed and thereby the specific area is reduced.

For pulverizing the coke and the like, a high-speed rotation pulverizer (e.g., hammer mill, pin mill, cage mill), a ball mill of various types (e.g., rolling mill, vibrating mill, planetary mill), a stirring mill (e.g., bead mill, attritor, circulating tube-type mill, annular mill) or the like may be used. Furthermore, a screw mill, turbo-mill, supermicron mill or jet mill of a pulverizer may also be used by selecting the conditions.

The coke and the like are pulverized by means of such a pulverizer and at this time, the average particle size is preferably adjusted to from 8 to 30 μm by selecting the pulverization conditions and if desired, classifying the powder. More preferably, particles having a particle size of 3 μm or less and/or particles having a particle size of 53 μm or more are substantially removed to reduce the amount of the particles having these particle sizes to 5% by weight or less of each, preferably 1% by weight or less. When particles having a particle size of 3 μm or less and particles having a particle size of 53 μm or more are removed, the resulting particles have an average particle size of from 10 to 25 μm.

The classification of coke powder and the like may be performed by any method as far as the particles can be separated. For example, a sieve classification method or an air classifier such as a forced vortex-type centrifugal classifier (e.g., micron separator, turbo-plex, turbo-classifier, superseparator) or inertial classifier (e.g., modified virtual impactor, elbow jet) may be used. Furthermore, a wet sedimentation or centrifugal classification method may also be used.

The temperature for the graphitization of coke and the like powder is preferably high, however, there are limits due to the apparatus used or the like. Accordingly, the graphitization temperature is preferably 2,500 to 3,200° C. The graphitization may be performed by a method of using an Acheson furnace where coke and the like powder is placed in a graphite crucible and electricity is passed directly therethrough, or a method of heating the powder by a graphite heating element.

In the case of incorporating boron (B) into the graphite powder, a boron source such as B single element, $H_3BO_3$, $B_2O_3$, $B_4C$ or BN is added to the coke and the like powder, and the powder is well mixed and then graphitized. If the B compound is non-uniformly mixed, the product itself is disproportionated and moreover, the compound is likely to sinter during graphitization. The amount of B added is small, therefore, the boron source is preferably formed into a powder having a particle size of 50 μm or less, preferably 20 μm or less before mixing it with the coke and the like powder. The amount of boron in the graphite powder is sufficient if it is 10% by weight or less. Therefore, the amount of the boron source added to coke and the like is set such that the graphite powder after graphitization has a B element content of 10% by weight or less.

The specific surface area of the graphite powder can be adjusted to 3 $m^2/g$ or less by the above-described control of the average particle size, the removal of fine particles, the graphitization of coke powder after pulverization or a combination thereof.

A small aspect ratio of the graphite powder particles can be obtained by pulverizing the coke and the like before graphitization, when the crystals are not fully grown, and thereby reducing the amount of scaly particles. The aspect ratio may be increased by removing fine particles having a particle size of 3 μm or less. In this way, the aspect ratio of the graphite powder can be adjusted to 6 or less, preferably to 5 or less.

The bulk density of the graphite powder becomes higher as the aspect ratio becomes smaller. On the other hand, the bulk density decreases as the amount of fine particles having a small particle size increases. Even with the same average particle size, the bulk density varies depending on the particle size distribution of the powder. When the graphite material is pulverized and then graphitized, the surface is smoothed as the crystallization progresses and the unevenness is reduced. By this method, the bulk density is increased.

Using such controlling of the aspect ratio and the average particle size and adjustment of the particle size distribution by classification or the like, the tapping bulk density is increased to 0.8 $g/cm^3$ or more, preferably 0.9 $g/cm^3$ or more.

The battery of the present invention is the battery which is produced by using the above graphite powder as a main material of negative electrode. In the battery of the present invention, positive electrode materials such as metallic oxides, metallic sulfides, electrically conducting polymers, or carbon materials, which are electrode active materials (positive electrode active materials) having a high oxidation-reduction potential, are preferably used because the battery with a high voltage and high capacity can be obtained. Among these electrode active materials, in view of the improvement of the filling density and volumetric capacity density, metallic oxides such as cobalt oxide, manganese oxide, vanadium oxide, nickel oxide, and molybdenum oxide, metallic sulfides such as molybdenum sulfide, titanium sulfide, and vanadium sulfide are preferred; in particular, manganese oxide, nickel oxide, cobalt oxide, or the like is preferred in view of high capacity and high voltage.

In this case, the manufacturing methods of metallic oxides or metallic sulfides are not limited, for example these may be produced according to the usual electrolysis or heating, as described in Electrochemistry, vol. 22, page 574, 1954. In addition, when they are used as electrode active materials in a lithium battery, Li elements are used preferably in an inserted state (in a complex state) in metallic oxide or metallic sulfide, for example, in the form of $Li_xCoO_2$, $Li_xMnO_2$ or the like, at the time of manufacturing the battery. The method is for inserting Li is not limited, for example, may be a method of electrochemically inserting Li ions, or a method in which salts such as $Li_2CO_3$ and metallic oxides are mixed and heat treated as described in U.S. Pat. No. 4,357,215.

In view of softness and ease of forming a film, electrically conducting polymers are preferred as the positive electrode material. Examples thereof are polyaniline, polyacetylene and derivatives thereof, polyparaphenylene and derivatives thereof, polypyrrole (polypyrrolylene) and derivatives thereof, polythienylene and derivatives thereof, polypyridinediyl and derivatives thereof, polyisothianaphtenylene and derivatives thereof, polyfurilene and derivatives thereof, polyselenophene and derivatives thereof, polyarylenevinylene such as polyparaphenylenevinylene, polythienylenevinylene, polyfurilenevinylene, polynaphtelenevinylene, polyselenophenevinylene, polypyridinediylvinylene, and derivatives thereof. Among these, polymers of aniline derivatives which are soluble in organic solvents are particularly preferred. The electrically conducting polymers used as the electrode active material in the battery or electrode may be produced according to chemical or electrochemical methods or other conventional methods.

In addition, as other organic compounds, disulfide compounds such as 2,5-dimercapto-1,3,4-thiadiazol, mixtures of disulfide compounds, and electrically conducting polymers have high capacity and are preferred.

The examples of the electrolytic solution used in the present invention may include oligoethers such as triethyleneglycol dimethylether, tetraethyleneglycol dimethylether; carbonates such as ethylene carbonate, propylene carbonate, dimethylcarbonate, diethylcarbonate, vinylene carbonate, (meth)acrylonitril carbonate; lactones such as γ-butylolactone; aromatic nitrites such as benzonitrile, tolunitrile; sulfur containing or nitrogen containing compounds such as dimethylformamide, dimethylsulfoxide, N-methylpyrolidone, N-vinylpyrolidone, sulfolane; phosphoric esters; alcohols such as ethanol, propanol, butanol. Among these, oligoethers, carbonates, and lactones are preferred.

As separators, porous membranes of polyethylene (PE), porous membranes of polypropylene (PP), porous membranes of PP/PE/PP, and films of solid polyelectrolyte containing an ethyleneoxide group may be used.

The examples of alkali metal salts which can be used as electrolytes include $LiCF_3$, $SO_3$, $LiPF_3$, $LiPF_6$, $LiClO_4$, LiI, $LiBF_4$, LiSCN, $LiAsF_6$, $LiN(CF_3SO_2)_3$, and the like.

The present invention is described in greater detail below by referring to the Examples.

The cokes used in the Examples and Comparative Examples are LPC-S coke produced by Shin Nittetsu Kagaku K.K. as non-needle coke (calcined product) (hereinafter referred to as Coke A) and LPC-UL coke produced by the same company as a needle coke (calcined product) (hereinafter referred to as Coke B). In the respective Examples and Comparative Examples, 30 kg of the coke was used for the test.

Measurement of the Battery Properties

In the following examples and comparative examples, the measurements of the battery properties were performed under the same condition after the following batteries were produced.

A graphite powder, having added thereto 3% by weight of polyvinylidene fluoride powder and a small quantity of N-methylpyrrolidone, was kneaded and press-bonded to a copper mesh to form a negative electrode. For evaluating the properties of this electrode as a single pole, a three-pole cell using lithium metal for the counter electrode and the reference electrode was manufactured.

The electrolytic solution used was a mixed solution of ethylene carbonate having dissolved therein 1 mol/l of $LiPF_6$ with dimethylene carbonate (1:1 by volume). The assembly of the batteries was conducted in a glove box in an argon atmosphere regulated for dryness to have a dew point of −60° C. or less. During the charging and discharging of the battery, the electric potential was controlled within a range of 0 to 1.5 V, and the current density was 0.2 mA/cm$^2$ in both the charging and the discharging. The battery properties are shown in Table 1. In the table, the charge and discharge efficiency indicate the ratio of the electric capacity discharged to the electric capacity charged.

EXAMPLE 1

Coke A was coarsely pulverized in a pulverizer (manufactured by Hosokawa micron K.K.) into a size of from 2 to 3 mm or less. This coarsely pulverized product was finely pulverized in a jet mill (IDS2UR, manufactured by Nippon Neumatic K.K.). At this time, 96% (% means % by weight, hereinafter the same) of the coarse particles having a particle size of 35 μm or more were continuously removed. The powder particles were air-classified in a turbo-classifier (TC15N, manufactured by Nisshin Engineering K.K.) to remove particles having a particle size of 5 μm or less. At this time, the average aspect ratio was 4.0. A part of this pulverized product (15 kg) was sealed into a graphite crucible with a cover having an internal diameter of 40 cm and a volume of 40 l, the crucible was placed in a graphitizing furnace with a graphite heater and the powder was graphitized at a temperature of 2,800° C. The powder was left standing to cool and taken out to obtain 14 kg of powder. This powder was passed through a 270 mesh (53 μm) according to the ASTM Standards to remove particles having a particle size of 53 μm or more which were produced to a small extent due to coagulation during the graphitization. The properties of the graphite powder obtained are shown in Table 1.

The powder, which was obtained by pulverizing, size-regulating, and then graphitizing, was satisfactory in specific surface area, aspect ratio, and bulk density, and had excellent coating performance, and increased carbon density. However, since boron (B) was not used, the discharge capacity was 281 mAh/g, which was, however, higher than that of Comparative Example 1.

EXAMPLE 2

Coke A was coarsely pulverized in a pulverizer (manufactured by Hosokawa micron K.K.) into a size of from 2 to 3 mm or less. This coarsely pulverized product was finely pulverized in a jet mill (IDS2UR, manufactured by Nippon Neumatic K.K.). At this time, 95% of the coarse particles having a particle size of 50 μm or more were continuously removed. The powder particles were air-classified in a turbo-classifier (TC15N, manufactured by Nisshin Engineering K.K.) to remove particles having a particle size of 5 μm or less. At this time, the average aspect ratio was 3.9. A part of this pulverized product (15 kg) was sealed into a graphite crucible with a cover having an internal diameter of 40 cm and a volume of 40 l, the crucible was placed in an Acheson furnace and the powder was graphitized at a temperature of 2,900° C. The powder was left standing to cool, taken out, and unbinded using SPARTAN-RYUZER to obtain 14 kg of powder. This powder was passed through a 270 mesh (53 μm) according to the ASTM Standard to remove particles having a particle size of 53 μm or more. The properties of the graphite powder obtained are shown in Table 1. The powder, which was obtained by pulverizing and then graphitizing as in Example 1, had a satisfactory specific surface area, aspect ratio, and bulk density.

EXAMPLE 3

Coke A was coarsely pulverized in a pulverizer (manufactured by Hosokawa micron K.K.) into a size of from 2 to 3 mm or less. This coarsely pulverized product was finely pulverized in a jet mill (IDS2UR, manufactured by Nippon Neumatic K.K.). At this time, 95% of the coarse particles having a particle size of 50 μm or more were continuously removed. The powder particles were air-classified in a turbo-classifier (TC15N, manufactured by Nisshin Engineering K.K.) to remove particles having a particle size of 5 μm or less. At this time, the average aspect ratio was 4.0. To a part of this pulverized product (14.4 kg), 0.6 kg of boron carbide ($B_4C$) was added and mixed in a Henschel mixer at 800 rpm for 5 minutes. The mixed powder was sealed into a graphite crucible with a cover having an internal diameter of 40 cm and a volume of 40 l, the crucible was placed in a graphitizing furnace with a graphite heater and the powder was graphitized at a temperature of 2,900° C. The powder was left standing to cool and taken out to obtain 14 kg of powder. This powder was passed through a 270 mesh (53 μm) according to the ASTM Standards to remove particles having a particle size of 53 μm or more. The properties of the graphite powder obtained are shown in Table 1.

In this Example, the powder was obtained by size-regulating, adding $B_4C$, and graphitizing, and the negative electrode material had excellent coating performance and excellent battery performance such as a discharge capacity of 335 mAh/g and an initial efficiency of 91%. In addition, the material had excellent conductivity and stability, having a powder resistance as low as 0.0030 Ωcm, and an oxidation initial temperature as high as 631° C., which are not obtained in the usual graphitized powders of cokes.

EXAMPLE 4

Coke A was coarsely pulverized in a pulverizer (manufactured by Hosokawa micron K.K.) into a size of from 2 to 3 mm or less.

This coarsely pulverized product was finely pulverized in a jet mill (IDS2UR, manufactured by Nippon Neumatic K.K.). At this time, 95% of the coarse particles having a particle size of 50 Å or more were continuously removed. At this time, the average aspect ratio was 3.9. $B_4C$ in an amount of 4% by weight was mixed with this pulverized product, a part of this mixture (15 kg) was sealed into a graphite crucible with a cover having an internal diameter of 40 cm and a volume of 40 l, the crucible was placed in a graphitizing furnace with a graphite heater and the powder was graphitized at a temperature of 2,800° C. The powder was left standing to cool and taken out to obtain 14 kg of powder. This powder was passed through a 270 mesh (53 μm) according to the ASTM Standards to remove particles having a particle size of 53 μm or more. The properties of the graphite powder obtained are shown in Table 1. By using material, as in Example 3, the obtained electrode had excellent conductivity and stability.

EXAMPLE 5

Coke A was coarsely pulverized in a pulverizer (manufactured by Hosokawa micron K.K.) into a size of from 2 to 3 mm or less. This coarsely pulverized product was finely pulverized in a jet mill (IDS2UR, manufactured by Nippon Neumatic K.K.) into a size of 50 μm or less. To a part of this pulverized product (14.4 kg), 0.6 kg of boron carbide ($B_4C$) was added and mixed as in Example 3. This fine powder was sealed into a similar graphite crucible with a cover having an internal diameter of 40 cm and a volume of 40 l, the crucible was placed in a graphitizing furnace as above and the powder was graphitized at a temperature of 2,900° C. The powder was left standing to cool, taken out, and finely pulverized by a jet mill, and the fine powder of 5 μm or less was removed using a T-PLEX (manufactured by Hosokawa micron K.K.). This powder was passed through a 270 mesh (53 μm) according to the ASTM Standards to remove particles having a particle size of 53 μm or more. The properties of the graphite powder obtained are shown in Table 1. Since this powder was obtained by pulverization after graphitization as in Comparative Examples 1 and 2, the powder had an aspect ratio of 6.1 and a specific surface area of 4.1 $m^2/g$, which were not satisfactory. However, since $B_4C$ was added and graphitized, the powder had a discharge capacity of 345 mAh/g, an initial efficiency of 89%, and had a high powder resistance of 0.0033 Ωcm and a high oxidation initiation temperature of 633° C., exhibiting performance as good as in Examples 3 and 4.

EXAMPLE 6

Coke A was coarsely pulverized in a pulverizer (manufactured by Hosokawa micron K.K.) into a size of from 2 to 3 mm or less. This coarsely pulverized product was finely pulverized in a jet mill (IDS2UR, manufactured by Nippon Neumatic K.K.). At this time, 95% of the coarse particles having a particle size of 50 μm or more were continuously removed. The powder particles were air-classified in a turbo-classifier (TC15N, manufactured by Nisshin Engineering K.K.) to remove particles having a particle size of 5 μm or less. At this time, the average aspect ratio was 4.5. To a part of this pulverized product (14.4 kg), 0.6 kg of boron carbide ($B_4C$) was added and mixed in a Henschel mixer at 800 rpm for 5 minutes. The mixture powder was sealed into a graphite crucible with a cover having an internal diameter of 40 cm and a volume of 40 l, the crucible was placed in a graphitizing furnace as above and the powder was graphitized at a temperature of 2,850° C. The powder was left standing to cool and taken out to obtain 14 kg of powder. This powder was passed through a 270 mesh (53 μm) according to the ASTM Standards to remove particles having a particle size of 53 μm or more. The properties of the graphite powder obtained are shown in Table 1. As in Examples 3 and 4, good results were obtained.

EXAMPLE 7

Coke A was coarsely pulverized in a pulverizer (manufactured by Hosokawa micron K.K.) into a size of from 2 to 3 mm or less. This coarsely pulverized product was finely pulverized in a jet mill (IDS2UR, manufactured by Nippon Neumatic K.K.) into a size of 15 μm or less. At this time, the fine powder of 3 μm or less was removed using T-PLEX (manufactured by Hosokawa micron K.K.). At this time, the average aspect ratio was 6.2. To a part of this pulverized product (14.4 kg), 0.6 kg of boron carbide ($B_4C$) was added and mixed. A part of this pulverized product (15 kg) was sealed into a similar graphite crucible with a cover having an internal diameter of 40 cm and a volume of 40 l, the crucible was placed in an Acheson furnace and the powder was graphitized at a temperature of 2,800° C. The powder was left standing to cool, taken out, and unbinded using SPARTAN-RYUZER. This powder was passed through a 270 mesh (53 μm) according to the ASTM Standards to remove particles having a particle size of 53 μm or more. The properties of the graphite powder obtained are shown in Table 1. Although this powder was fine, the powder was obtained by pulverization, addition of B, and graphitization. Even though the aspect ratio was 6 or more, the capacity, efficiency, powder resistance, and oxidation initiation temperature were satisfactory.

EXAMPLE 8

Coke A was coarsely pulverized in a pulverizer (manufactured by Hosokawa micron K.K.) into a size of from 2 to 3 mm or less. This coarsely pulverized product was finely pulverized in a jet mill (IDS2UR, manufactured by Nippon Neumatic K.K.) into an average size of 50 μm or less. The powder particles were air-classified in a turbo-classifier (TC15N, manufactured by Nisshin Engineering K.K.) to remove 98% of the particles having a particle size of 3 μm or less. At this time, the average aspect ratio was 4.1. To a part of this pulverized product (14.4 kg), 0.6 kg of boron carbide ($B_4C$) was added and mixed in a Henschel mixer at 800 rpm for 5 minutes. This fine powder was sealed into a similar graphite crucible with a cover having an internal diameter of 40 cm and a volume of 40 l, the crucible was placed in a graphitizing furnace and the powder was graphitized at a temperature of 2,900° C. The powder was left standing to cool, taken out, and unbinded using SPARTAN-RYUZER to obtain 14 kg of powder. This powder was passed through a 270 mesh (53 μm) according to the ASTM Standards to remove particles having a particle size of 53 μm or more. The properties of the graphite powder obtained are shown in Table 1. Although this powder contained about 4.1% of fine powder, the powder had large particle size, so the specific surface area, aspect ratio, capacity, efficiency, powder resistance, and oxidation initiation temperature were satisfactory.

COMPARATIVE EXAMPLE 1

Coke A was placed, without any pretreatment, in a graphitizing furnace as described above and the powder was graphitized at a temperature of 2,800° C. The powder was left standing to cool and taken out. Thereafter, 15 kg of the powder was coarsely pulverized in a pulverizer (manufactured by Hosokawa micron K.K.) into a size of from 2 to 3 mm or less. This coarsely pulverized product was finely pulverized in a jet mill (IDS2UR, manufactured by Nippon Neumatic K.K.). At this time, 95% of the coarse particles having a particle size of 35 μm or more were continuously removed. The powder particles were then air-classified in a turbo-classifier (TC15N, manufactured by Nisshin Engineering K.K.) to remove 95% of the particles having a particle size of 5 μm or less. At this time, the average aspect ratio was 5.1. This powder was passed through a 270 mesh (53 μm) according to the ASTM Standards to remove particles having a particle size of 53 μm or more. The properties of the graphite powder obtained are shown in Table 1. Since this powder was obtained by pulverization after graphitization, the specific surface area was large, bulk density was small, the discharge capacity was small, and the powder resistance was as much as 0.101 Ωcm.

COMPARATIVE EXAMPLE 2

Coke A was placed in a graphitizing furnace as above and the powder was graphitized at a temperature of 2,900° C. The powder was left standing to cool and taken out. Thereafter, 15 kg of the powder was coarsely pulverized in a pulverizer (manufactured by Hosokawa micron K.K.) into a size of from 2 to 3 mm or less. 15 kg of this coarsely pulverized product was finely pulverized in a jet mill (IDS2UR, manufactured by Nippon Neumatic K.K.). At this time, 95% of the coarse particles having a particle size of 50 μm or more were continuously removed. The powder particles were then air-classified in a turbo-classifier (TC15N, manufactured by Nisshin Engineering K.K.) to remove 98% of the particles having a particle size of 8 μm or less. At this time, the average aspect ratio was 5.4. This powder was passed through a 270 mesh (53 μm) according to the ASTM Standards to remove particles having a particle size of 53 μm or more. The properties of the graphite powder obtained are shown in Table 1. Although this powder was obtained by pulverization after graphitization, as in Example 1, the specific area was large, bulk density was small, and therefore, the discharge capacity was not sufficient.

COMPARATIVE EXAMPLE 3

Coke B was coarsely pulverized in a pulverizer (manufactured by Hosokawa micron K.K.) into a size of from 2 to 3 mm or less. This coarsely pulverized product was finely pulverized in a jet mill (IDS2UR, manufactured by Nippon Neumatic K.K.) into a size of 15 μm or less. At this time, 95% of the coarse particles having a particle size of 10 μm or more were continuously removed. The powder particles were air-classified in a turbo-classifier (TC15N, manufactured by Nisshin Engineering K.K.) to remove 98% of the particles having a particle size of 1.0 μm or less. At this time, the average aspect ratio was 7.8. A part of this pulverized product (15 kg) was sealed into a graphite crucible with a cover having an internal diameter of 40 cm and a volume of 40 l, the crucible was placed in a graphitizing furnace and the powder was graphitized at a temperature of 2,800° C. The powder was left standing to cool and taken out to obtain 14 kg of powder. This powder was passed through a 270 mesh (53 μm) according to the ASTM Standards to remove particles having a particle size of 53 μm or more. The properties of the graphite powder obtained are shown in Table 1. This powder had very poor discharge capacity because of the large specific surface area compared with Examples 1 and 2.

COMPARATIVE EXAMPLE 4

Coke B was coarsely pulverized in a pulverizer (manufactured by Hosokawa micron K.K.) into a size of from 2 to 3 mm or less. This coarsely pulverized product was finely pulverized in a jet mill (IDS2UR, manufactured by Nippon Neumatic K.K.). At this time, 95% of the coarse particles having a particle size of 50 μm or more were continuously removed. The powder particles were air-classified in a turbo-classifier (TC15N, manufactured by Nisshin Engineering K.K.) to remove 98% of the particles having a particle size of 5 μm or less. At this time, the average aspect ratio was 6.4.

A part of this pulverized product (15 kg) was sealed into a graphite crucible with a cover having an internal diameter of 40 cm and a volume of 40 l, the crucible was placed in an Acheson furnace and the powder was graphitized at a temperature of 2,800° C. The powder was left standing to cool and taken out to obtain 14 kg of powder. This powder was passed through a 270 mesh (53 μm) according to the ASTM Standards to remove particles having a particle size of 53 μm or more. The properties of the graphite powder obtained are shown in Table 1. This powder had large aspect ratio of 6.4 and therefore a small bulk density of 0.71 $m^2/g$.

COMPARATIVE EXAMPLE 5

Coke B was coarsely pulverized in a pulverizer (manufactured by Hosokawa micron K.K.) into a size of from 2 to 3 mm or less. This coarsely pulverized product was finely pulverized in a jet mill (IDS2UR, manufactured by Nippon Neumatic K.K.) into an average size of 40 μm or less. At this time, the average aspect ratio was 6.0. A part of this pulverized product (15 kg) was sealed into a graphite crucible with a cover having an internal diameter of 40 cm and a volume of 40 l, the crucible was placed in a graphitizing furnace with a graphite heater and the powder was graphitized at a temperature of 2,800° C. The powder was left standing to cool and taken out to obtain 14 kg of powder. This powder was passed through a 270 mesh (53 μm) according to the ASTM Standards to remove particles having a particle size of 53 μm or more. The properties of the graphite powder obtained are shown in Table 1. This powder had large particle size, however, it contained a large amount of fine powder, and had small bulk density.

TABLE 1

| Example and Comparative Example No. | Average Particle Size (μm) | Specific surface Area ($m^2/g$) | Aspect Ratio | Bulk Density ($g/cm^3$) | 5 μm or Less (wt %) | 53 μm or More (wt %) | Lattice Spacing (Co Value) (Å) | B Content (wt %) | Specific Electric Resistance (Ω cm) | Oxidation Initiation Temperature (° C.) | Discharge Capacity (mAh/g) | Initial Efficiency (%) |
|---|---|---|---|---|---|---|---|---|---|---|---|---|
| Example 1 | 11 | 2.54 | 4.0 | 0.98 | 0.2 | 0 | 6.733 | 0 | 0.091 | 572 | 281 | 80 |
| Example 2 | 21.4 | 1.71 | 3.9 | 1.1 | 0 | 0 | 6.740 | 0 | 0.088 | 573 | 289 | 87 |
| Example 3 | 20.6 | 1.34 | 4.0 | 1.0 | 0 | 0.2 | 6.717 | 0.98 | 0.0030 | 631 | 335 | 91 |
| Example 4 | 20.5 | 1.99 | 3.9 | 0.97 | 0.3 | 0 | 6.716 | 1.3 | 0.0031 | 633 | 335 | 91 |
| Example 5 | 22.5 | 4.10 | 6.1 | 0.89 | 0 | 0 | 6.716 | 2.10 | 0.0033 | 633 | 345 | 89 |
| Example 6 | 21.4 | 2.03 | 4.5 | 1.02 | 0 | 0 | 6.717 | 2.12 | 0.0034 | 632 | 339 | 91 |
| Example 7 | 8.5 | 2.92 | 6.2 | 0.80 | 0 | 0 | 6.720 | 1.09 | 0.0031 | 628 | 321 | 88 |
| Example 8 | 29.0 | 2.82 | 4.1 | 0.81 | 4.1 | 0 | 6.715 | 0.97 | 0.0030 | 631 | 341 | 91 |
| Comparative Example 1 | 10.6 | 9.26 | 5.1 | 0.67 | 0.4 | 0 | 6.735 | 0 | 0.101 | 569 | 278 | 81 |
| Comparative Example 2 | 20.5 | 6.14 | 5.4 | 0.77 | 0 | 0 | 6.737 | 0 | 0.096 | 571 | 279 | 85 |
| Comparative Example 3 | 7.8 | 13.1 | 7.8 | 0.65 | 6.6 | 0 | 6.734 | 0 | 0.089 | 570 | 267 | 77 |
| Comparative Example 4 | 20.5 | 2.31 | 6.4 | 0.71 | 0 | 0 | 6.743 | 0 | 0.051 | 575 | 252 | 85 |
| Comparative Example 5 | 31.1 | 2.92 | 6.0 | 0.78 | 2.5 | 0.1 | 6.733 | 0 | 0.078 | 572 | 240 | 83 |

INDUSTRIAL APPLICABILITY

A lithium battery using the graphite powder of the present invention for the negative electrode is advantageous in that the discharge capacity is large, the cycle property (battery life) is good, and the initial charge and discharge efficiency (discharge capacity to charge capacity of initial 1 to 3 times) is high.

What is claimed is:

1. A carbon material for a lithium battery, comprising graphite powder having an oxidation initiation temperature of not less than 600° C., a specific surface area of not more than 3 $m^2/g$, an aspect ratio of not more than 6, and a tapping bulk density of not less than 0.8 $g/cm^3$, wherein the content of particles having a particle size of 3 $\mu m$ or less is 1% by weight or less and the content of particles having a particle size of 53 $\mu m$ or more is 1% by weight or less, and wherein the graphite powder has a Co value of less than 6.720 Å.

2. A carbon material for a lithium battery comprising graphite having an oxidation initiation temperature of not less than 600° C., a specific surface area of not more than 3 $m^2/g$, an aspect ratio of not more than 6, and a tapping bulk density of not less than 0.8 $g/cm^3$, wherein when said powder is put under pressure to give said powder a bulk density of 1.5 $g/cm^2$, the specific electrical resistance of said powder along a direction perpendicular to the direction of the pressure is not more than 0.6 Ω·cm, and wherein the content of particles having a particle size of 3 $\mu m$ or less is 1% by weight or less and the content of particles having a particle size of 53 $\mu m$ or more is 1% by weight or less, and wherein the graphite powder has a Co value of less than 6.720 Å.

3. A carbon material for a lithium battery, consisting of graphite powder having a tapping bulk density of not less than 0.8 $g/cm^3$ and an oxidation initiation temperature of not less than 600° C., wherein when said powder is subject to pressure to give said powder a bulk density of 1.5 $g/cm^3$, a specific electrical resistance of said powder along a direction perpendicular to the direction of the pressure is not more than 0.06 Ω·cm, and wherein the content of particles having a particle size of 3 $\mu m$ or less is 1% by weight or less and the content of particles having a particle size of 53 $\mu m$ or more is 1% by weight or less, and wherein the graphite powder has a Co value of less than 6.720 Å.

4. A carbon material for a lithium battery, consisting of graphite powder having a tapping bulk density of not less than 0.8 $g/cm^3$ and an oxidation initiation temperature of not less than 600° C., and wherein the content of particles having a particle size of 3 $\mu m$ or less is 1% by weight or less and the content of particles having a particle size of 53 $\mu m$ or more is 1% by weight or less, and wherein the graphite powder has a Co value of less than 6.720 Å.

5. The carbon material for a lithium battery as claimed in claim 4, wherein a specific surface area is not more than 3 $m^2/g$.

6. The carbon material for a lithium battery as claimed in claim 4, wherein an aspect ratio is not more than 6.

7. A carbon material for a lithium battery, comprising graphite powder having a specific surface area of not more than 3 $m^2/g$ and a tapping bulk density of not less than 0.8 $g/cm^3$, wherein when said powder is put under pressure to give said powder a bulk density of 1.5 $g/cm^3$, a specific electrical resistance of said powder along a direction perpendicular to the direction of the pressure is not more than 0.06 Ω·cm, wherein the content of particles having a particle size of 3 $\mu m$ or less is 1% by weight or less and the content of particles having a particle size of 53 $\mu m$ or more is 1% by weight or less, wherein the graphite powder has a Co value of less than 6.720 Å, and wherein the graphite powder has an oxidation initiation temperature of not less than 600° C.

8. The carbon material for a lithium battery as claimed in one of claims 1, 2, 4, 5, and 7, wherein the graphite powder has an average particle size of from 8 to 30 $\mu m$.

9. The carbon material for a lithium battery as claimed in claim 3, wherein the graphite powder has an average particle size of from 8 to 30 $\mu m$.

10. The carbon material for a lithium battery as claimed in one of claims 1, 2, 4, 5, and 7, wherein the graphite powder contains boron.

11. The carbon material for a lithium battery as claimed in claim 3, wherein the graphite powder contains boron.

12. The carbon material for a lithium battery as claimed in claim 8, wherein the graphite powder contains boron.

13. The carbon material for a lithium battery as claimed in claim 9, wherein the graphite powder contains boron.

14. A carbon material for a lithium battery, comprising graphite powder having an oxidation initiation temperature of not less than 600° C., a specific surface area of not more than 3 $m^2/g$, and aspect ration of not more than 6, and a tapping bulk density of not less than 0.8 $g/cm^3$, wherein the content of particles having a particle size of 3 $\mu m$ or less is 1% by weight or less and the content of particles having a particle size of 53 $\mu m$ or more is 1% by weight or less, and wherein the graphite powder has a Co value of 6.717 Å or less.

15. A paste for a negative electrode of a battery, wherein said paste is obtained from the graphite powder as claimed in one of claims 1, 2, 4, 5, and 7 as a main material by adding polyvinylidene fluoride powder thereto and kneading.

16. A paste for a negative electrode of a battery, wherein said paste is obtained from the graphite powder as claimed in claim 3 as a main material by adding polyvinylidene fluoride powder thereto and kneading.

17. A battery comprising a negative electrode produced from the graphite powder as claimed in one of claims 1, 2, 4, 5, and 7 as a main material.

18. A battery comprising a negative electrode produced from the graphite powder as claimed in claim 3 as a main material.

19. A lithium battery comprising a negative electrode produced from the graphite powder as claimed in one of claims 1, 2, 4, 5, and 7 as a main material.

20. A lithium battery comprising a negative electrode produced from the graphite powder as claimed in claim 3 as a main material.

21. A method for manufacturing the carbon material for a lithium battery as claimed in claim 1, which comprises pulverizing coke or other carbonized raw material prior to graphitization, classifying the resulting particles, and then graphitizing the particles.

22. A method for manufacturing the carbon material for a lithium battery as claimed in claim 2, which comprises pulverizing coke or other carbonized raw material prior to graphitization, classifying the resulting particles, and then graphitizing the particles.

23. A method for manufacturing the carbon material for a lithium battery as claimed in claim 3, which comprises pulverizing coke or other carbonized raw material prior to graphitization, classifying the resulting particles, and then graphitizing the particles.

24. A method for manufacturing the carbon material for a lithium battery as claimed in claim 4, which comprises pulverizing coke or other carbonized raw material prior to graphitization, classifying the resulting particles, and then graphitizing the particles.

25. A method for manufacturing the carbon material for a lithium battery as claimed in claim 7, which comprises pulverizing coke or other carbonized raw material prior to graphitization, classifying the resulting particles, and then graphitizing the particles.

* * * * *